(12) United States Patent
Liang et al.

(10) Patent No.: US 8,587,396 B2
(45) Date of Patent: Nov. 19, 2013

(54) ELECTRONIC DEVICE AND RETAINING MECHANISM FOR RETAINING A MAGNETIC ELEMENT OF THE ELECTRONIC DEVICE

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/463,097

(22) Filed: May 3, 2012

(65) Prior Publication Data
US 2012/0286908 A1 Nov. 15, 2012

(51) Int. Cl.
*H01H 9/00* (2006.01)
*G06F 1/16* (2006.01)
*H05K 5/00* (2006.01)
*H05K 7/00* (2006.01)

(52) U.S. Cl.
USPC .............. 335/205; 361/679.55; 361/679.58; 361/747; 361/810

(58) Field of Classification Search
USPC ........ 335/205; 361/679.55, 679.58, 747, 810; 248/206.5, 221.11
See application file for complete search history.

(56) References Cited

U.S. PATENT DOCUMENTS

| | | | |
|---|---|---|---|
| 6,151,486 A * | 11/2000 | Holshouser et al. | 455/575.3 |
| 6,366,440 B1 * | 4/2002 | Kung | 361/147 |
| 6,517,129 B1 * | 2/2003 | Chien et al. | 292/251.5 |
| 6,891,722 B2 * | 5/2005 | Chen et al. | 361/679.55 |
| 7,332,990 B2 * | 2/2008 | Lo et al. | 335/205 |
| 7,542,270 B2 * | 6/2009 | Chen | 361/679.25 |
| 8,009,424 B2 * | 8/2011 | Zhu et al. | 361/679.58 |
| 8,199,495 B2 * | 6/2012 | Liu et al. | 361/679.58 |
| 8,355,250 B2 * | 1/2013 | Yu | 361/679.58 |
| 2006/0056140 A1 * | 3/2006 | Lev | 361/683 |
| 2006/0071746 A1 * | 4/2006 | Lylyharju | 335/205 |

* cited by examiner

*Primary Examiner* — Mohamad Musleh
(74) *Attorney, Agent, or Firm* — Ladas & Parry, LLP

(57) ABSTRACT

An electronic device includes a magnetic switch, a magnetic element for actuating the magnetic switch to send a control signal to an electronic element module, and a retaining mechanism for retaining the magnetic element at a housing. The retaining mechanism includes a retaining casing, a connecting member, and a blocking member. The retaining casing is disposed on and cooperates with the housing to define a receiving space to receive the magnetic element, and has an opening in spatial communication with the receiving space. The blocking member is connected to the housing by the connecting member and is adjacent to the opening to prevent removal of the magnetic element from the receiving space through the opening.

19 Claims, 7 Drawing Sheets

ELECTRONIC DEVICE AND RETAINING MECHANISM FOR RETAINING A MAGNETIC ELEMENT OF THE ELECTRONIC DEVICE

CROSS-REFERENCE TO RELATED APPLICATION

This application claims priority of Taiwanese Application No. 100208234 filed on May 9, 2011, the disclosure of which is incorporated herein by reference.

BACKGROUND OF THE INVENTION

1. Field of the Invention

The present invention relates to a retaining mechanism of an electronic device, more particularly to a retaining mechanism for retaining a magnetic element to the electronic device.

2. Description of the Related Art

Referring to FIG. 11, Taiwanese Patent No. M348452, discloses a conventional magnetic fixing structure 120 for a notebook computer. The magnetic fixing structure 120 includes a bottom plate 121, a U-shaped frame 122, and a top wall 123. The U-shaped frame 122 is disposed perpendicularly on and connected to the bottom plate 121 and includes first, second, and third side walls 124, 125, 126. The first side wall 124 is disposed between the second and third side walls 125, 126. The top wall 123 cooperates with the U-shaped frame 122 to define a receiving space 127 and an opening 128. The opening 128 is opposite to the first side wall 124 of the U-shaped frame 122 and is in spatial communication with the receiving space 127. The receiving space 127 is used for receiving a magnetic element that is inserted into the receiving space 127 through the opening 128.

A distance (d) between the second side wall 125 and a portion of the third side wall 126 is smaller than a width dimension of the first side wall 124 as well as a dimension of the magnetic element in a direction that the second and third side walls 125, 126 are spaced apart. When the magnetic element is inserted into the receiving space 127 through the opening 128, the third side wall 126 is biased by the magnetic element so as to resiliently deform and to cooperate with the second side wall 125 to clamp the magnetic element therebetween. However, the magnetic element is apt to be removed from the receiving space 127 of the conventional magnetic fixing structure 120 when the notebook computer encounters an impact or an external force.

SUMMARY OF THE INVENTION

Therefore, an object of the present invention is to provide a retaining mechanism capable of alleviating the above mentioned drawback of the prior art.

According to an aspect of the present invention, an electronic device comprises a first body, a magnetic inductive switch, a second body, a magnetic element, and a retaining mechanism. The magnetic inductive switch is disposed in the first body. The second body is movably connected to the first body, and includes a housing and an electronic element module that is disposed in the housing and that is electrically connected to the magnetic inductive switch. The magnetic element is disposed in the second body for actuating the magnetic inductive switch to send a control signal to the electronic element module when the magnetic element is adjacent to the magnetic inductive switch. The retaining mechanism includes a retaining casing, a connecting member, and a first blocking member. The retaining casing is disposed on and cooperates with the housing of the second body to define a receiving space therebetween to receive the magnetic element therein, and has an opening that is in spatial communication with the receiving space. The connecting member is disposed on the housing of the second body. The first blocking member is connected to the housing of the second body by the connecting member, and includes a blocking wall disposed adjacent to the opening so as to prevent removal of the magnetic element from the receiving space through the opening.

Further, the housing has a wall surface, and the retaining casing includes a U-shaped wall disposed perpendicularly on the wall surface and a top wall that is spaced apart from the wall surface and that is connected perpendicularly to and cooperates with the U-shaped wall to define the receiving space and the opening.

Further, the U-shaped wall includes two side wall portions, each of which has a first wall segment and a second wall segment connected to the first wall segment, and a connecting wall portion connected between the first wall segments. The first wall segments are connected to and cooperate with the top wall of the retaining casing to define the receiving space. The second wall segments cooperatively define a guiding passage in spatial communication with the opening. The first blocking member has a portion fittingly disposed in the guiding passage.

Further, the second body is connected pivotally to the first body, and the housing of the second body includes a front plate and a rear plate joining the front plate. The wall surface is an inner surface of the front plate and facing the rear plate.

Moreover, the retaining mechanism further includes a second blocking member formed on the housing of the second body. The first blocking member is interposed between the second blocking member and the opening.

In addition, the first blocking member further includes a base board connected to the blocking wall and fixed on the housing by the connecting member.

Further, the base board and the blocking wall of the first blocking member are substantially in an L-shaped connection.

Moreover, the first blocking member further includes a rib disposed longitudinally on the base board and has one end connected to the blocking wall.

Further, the base board is formed with a through hole, and the connecting member includes a pillar made of a hot-melt material extending through the through hole of the base board, and having a part exposed from and pressing the base board after a heating process.

Alternatively, the connecting member is an adhesive.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
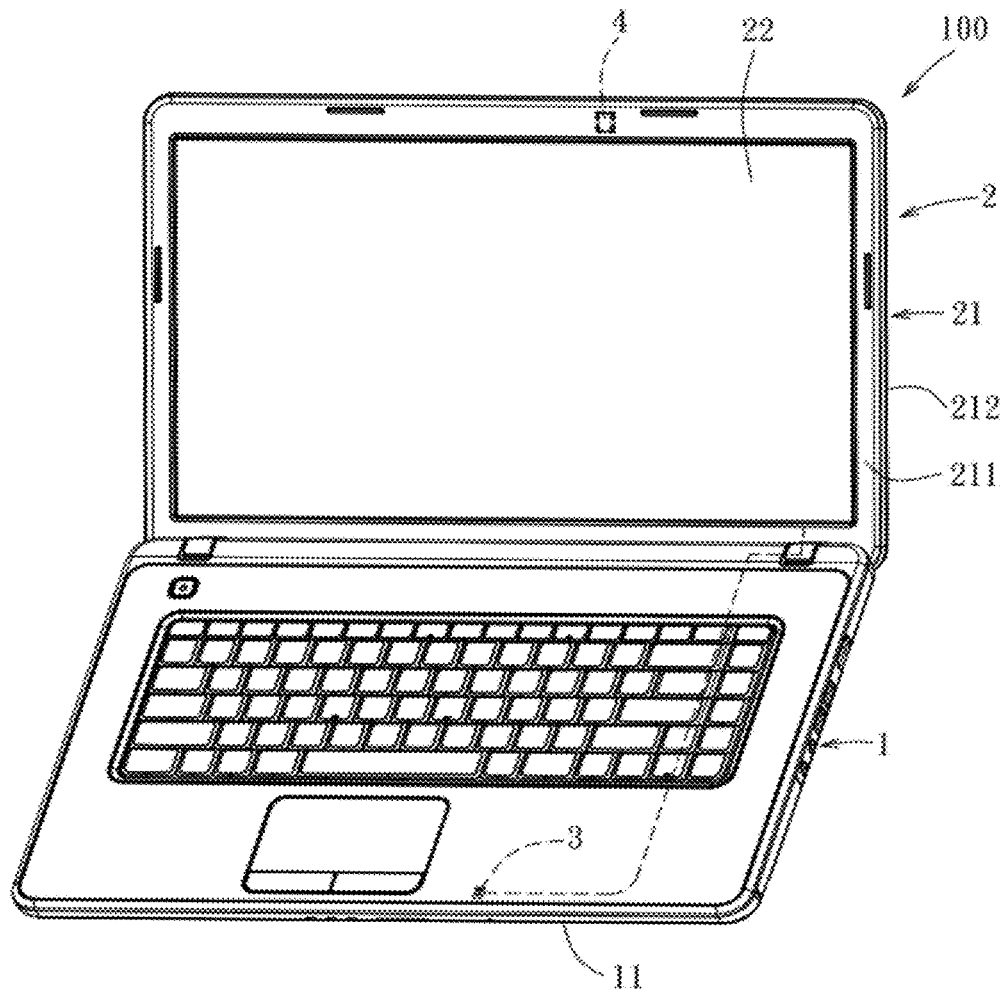
FIG. 1 is a perspective view of an embodiment of an electronic device according to the present invention.
Figure 2:
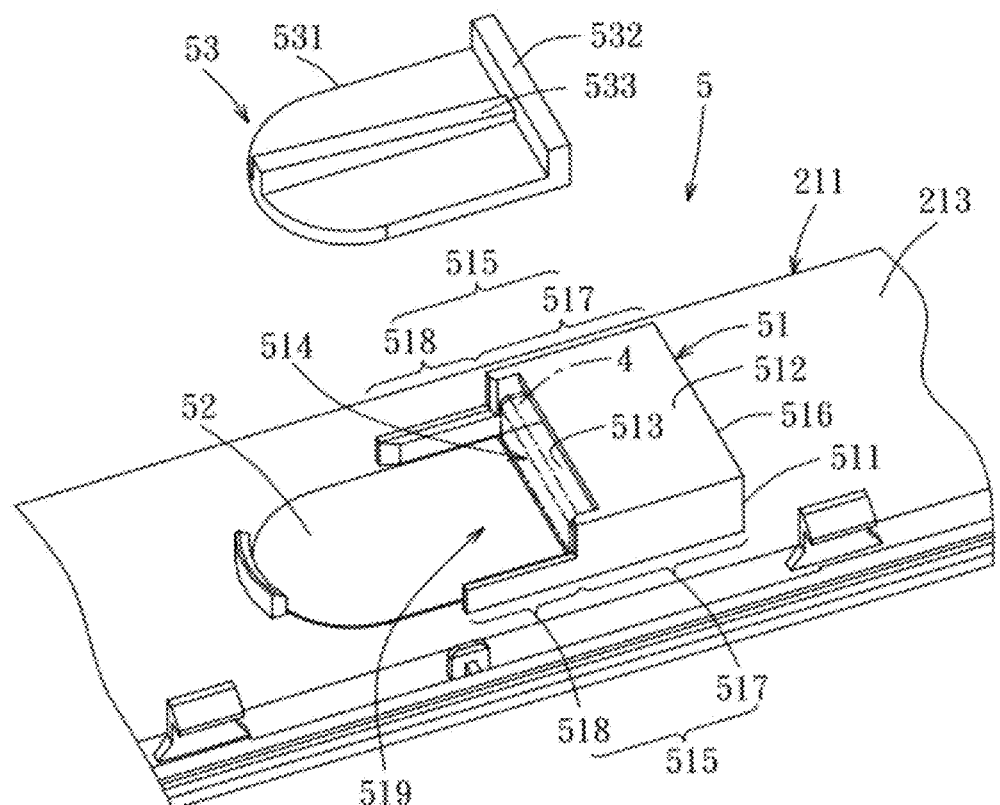
FIG. 2 is a partly exploded perspective view of a retaining mechanism disposed on a housing of the electronic device of the embodiment.

Referring to FIGS. 1 and 2, an embodiment of an electronic device 100 according to the present invention comprises a first body 1, a second body 2, a magnetic inductive switch 3, a magnetic element 4 (e.g., a magnet in this embodiment), and a retaining mechanism 5. The magnetic inductive switch 3 is disposed in the first body 1 and the magnetic element 4 is disposed in the second body 2. The second body 2 is connected pivotally to the first body 1, and is movable between a folded position, where the second body 2 is laid on the first body 1, and a lifted position, where the second body 2 is pivotally lifted up from the first body 1. The magnetic element 4 is for actuating the magnetic inductive switch 3 to send a control signal to an electronic element module 22 of the second body 2 when the magnetic element 4 is adjacent to the magnetic inductive switch 3, i.e., the second body 2 is moved to the folded position. In practice, the magnetic inductive switch 3 may generate control signals for controlling other electronic components in the first body 1 and the second body 2. In this embodiment, the electronic device 100 is a notebook computer, the first body 1 is a host machine, the second body 2 is a display screen, and the host machine is operable to supply power to the display screen according to the control signal. In other embodiments, the electronic device 100 may be other electronic devices with a slidable cover or a pivotable cover.

The first body 1 has a front edge 11 and the magnetic inductive switch 3 is disposed adjacent to the front edge 11.

The second body 2 further includes a housing 21, and the electronic element module 22 is disposed in the housing 2 and is electrically connected to the magnetic inductive switch 3. In this embodiment, the electronic element module 22 is a display module.

The retaining mechanism 5 is disposed on the housing 21 of the second body 2, and includes a retaining casing 51, a connecting member 52, and a first blocking member 53. Specifically, the housing 21 of the second body 2 includes a front plate 211 and a rear plate 212 joining the front plate 211. The front plate 211 has a wall surface 213, i.e., an inner surface that faces the rear plate 212. The electronic element module 22 is disposed between the front plate 211 and the rear plate 212, and the retaining casing 51 of the retaining mechanism 5 is disposed on the wall surface 213 in this embodiment.

As shown in FIG. 2, the retaining casing 51 includes a U-shaped wall 511 and a top wall 512. The U-shaped wall 511 is disposed perpendicularly on the wall surface 213. The top wall 512 is spaced apart from the wall surface 213, and is connected perpendicularly to and cooperates with the U-shaped wall 511 to define a receiving space 513 and an opening 514. The receiving space 513 receives the magnetic element 4 therein and the opening 514 is in spatial communication with the receiving space 513.

The first blocking member 53 is connected to the wall surface 213 of the housing 2 by the connecting member 52 at a position adjacent to the opening 514 so as to prevent removal of the magnetic element 4 from the receiving space 513 through the opening 514.

The U-shaped wall 511 includes two spaced-apart side wall portions 515, each of which has a first wall segment 517 and a second wall segment 518 connected to the first wall segment 517, and a connecting wall portion 516 connected between the first wall segments 517 in a U shape. Note that the first wall segments 517 are connected to and cooperate with the top wall 512 to define the receiving space 513 and the opening 514. The second wall segments 518 cooperatively define a guiding passage 519 that is in spatial communication with the opening 514. Namely, the top wall 512 is connected only to the first wall segments 517, and does not cover the second wall segments 518 and the guiding passage 519.

The first blocking member 53 includes a base board 531, a blocking wall 532, and a rib 533. The base board 531 has a portion fittingly disposed in the guiding passage 519. The base board 531 and the blocking wall 532 are substantially in an L-shaped connection. The rib 533 is disposed longitudinally on the base board 531 and has one end connected to the blocking wall 532.

Figure 3:
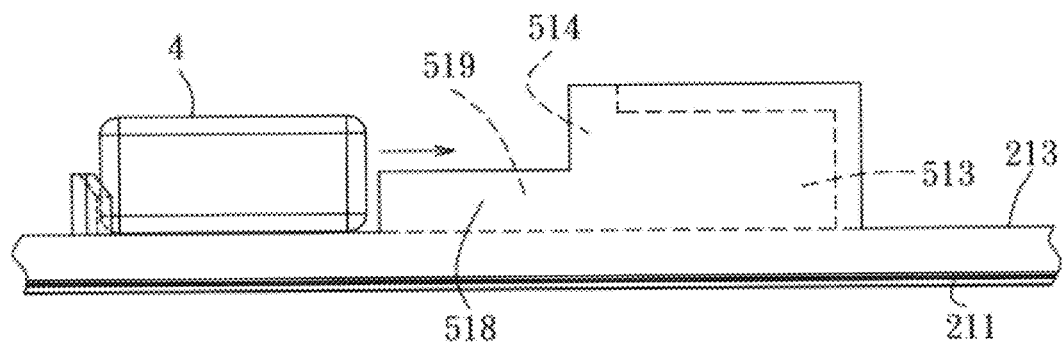
FIG. 3 is a side view of a retaining casing of the retaining mechanism of the first embodiment.
Figure 4:
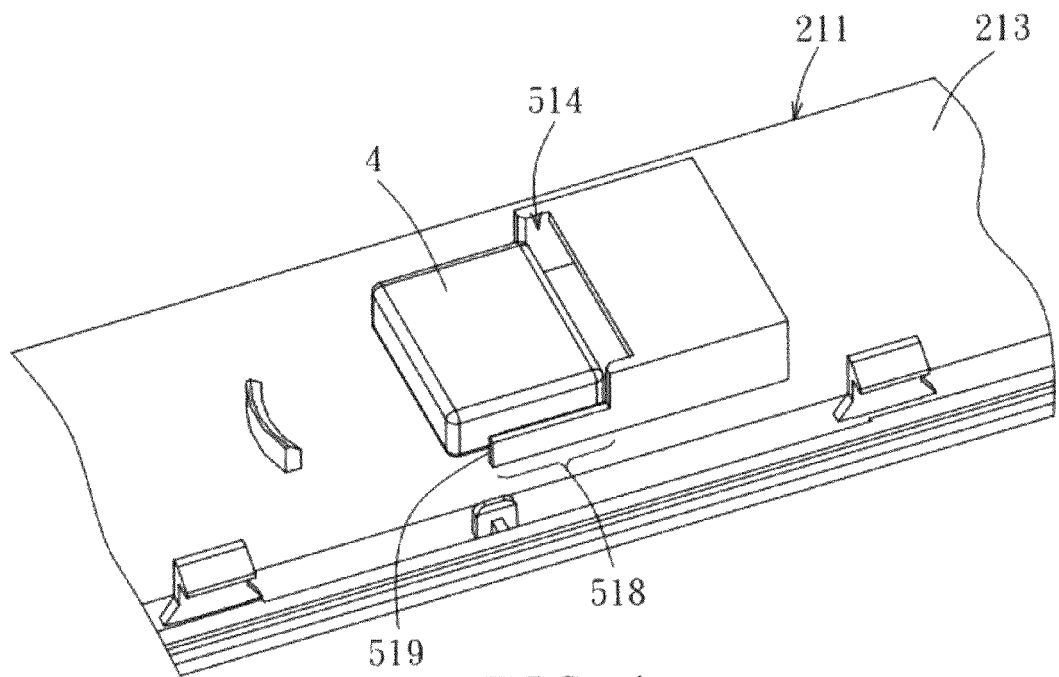
FIG. 4 is a perspective view of the retaining mechanism of the embodiment for illustrating a magnetic element to be inserted into the retaining casing.
Figure 5:
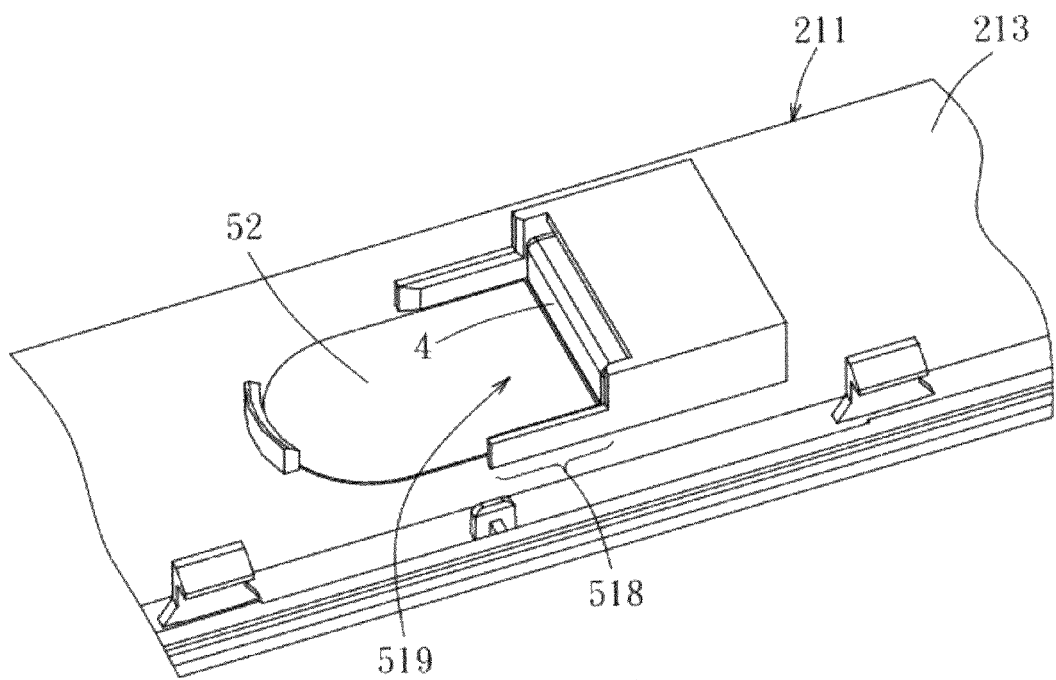
FIG. 5 is a perspective view of the retaining mechanism of the embodiment, where the magnetic element is disposed in the retaining casing and a connecting member of the retaining mechanism is disposed on the housing of the electronic device.

Referring to FIGS. 3 and 4, when it is desired to mount the magnetic element 4 to the housing 21 of the second body 2, the magnetic element 4 is first disposed on the wall surface 213 in front of the guiding passage 519 as shown in FIG. 3, is moved in a direction indicated by arrow shown in FIG. 3 to a position between the second wall segments 518 (i.e., the guiding passage 519) as shown in FIG. 4, and then is inserted into the receiving space 513 through the opening 514 via the guiding passage 519. Further referring to FIG. 5, the connecting member 52 is disposed on the wall surface 213 of the front plate 211 after the magnetic element 4 is inserted into the receiving space 513 and the connecting member 52 is an adhesive in this embodiment.

Figure 6:
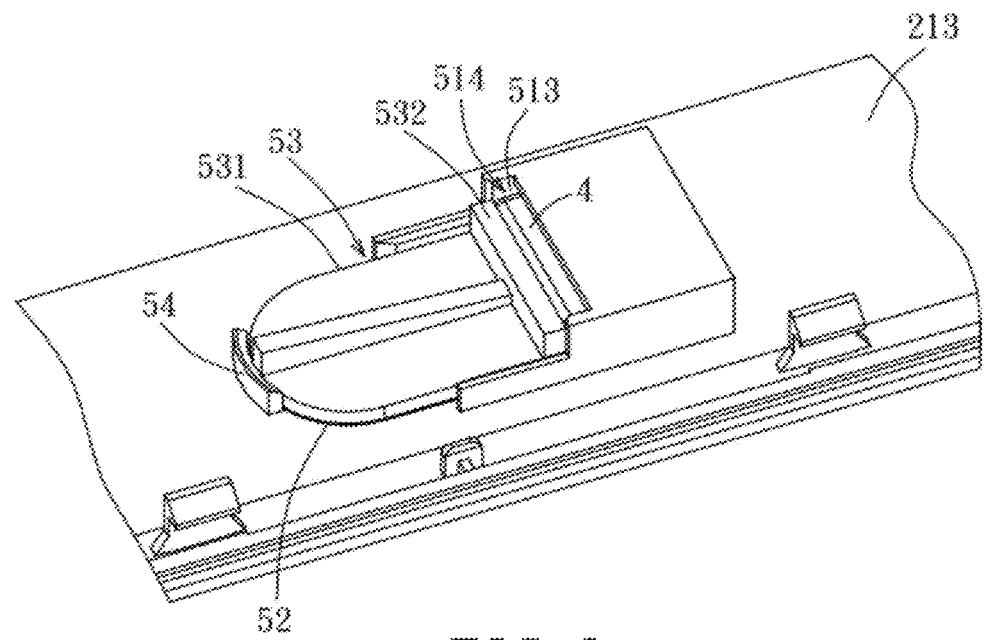
FIG. 6 is a perspective view of the retaining mechanism of the embodiment, where a first blocking member is disposed on the connecting member to prevent removal of the magnetic element from the retaining casing.
Figure 7:
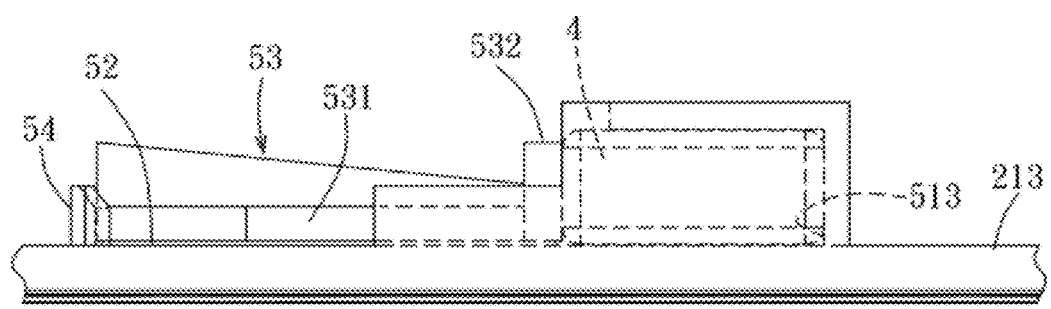
FIG. 7 is a side view of the retaining mechanism of the embodiment, where the magnetic element is retained in the retaining mechanism.

Subsequently, referring to FIGS. 6 and 7, the base board 531 of the first blocking member 53 is fixed on the wall surface 213 of the front plate 211 by the connecting member 52. The blocking wall 532 is disposed adjacent to the opening 514 so as to block the opening 514.

The blocking wall 532 is in contact with the magnetic element 4 when the magnetic element 4 is received in the receiving space 513 in this embodiment. It is noted that the blocking wall 532 may be spaced apart from the magnetic element 4 as long as a gap formed therebetween is not large enough to permit the magnetic element 4 to be removed from the receiving space 513 through the gap.

Additionally, to enhance strength of the first blocking member 53 to block the magnetic element 4, the retaining mechanism 5 further includes a second blocking member 54 that is formed on the wall surface 213 at a position corresponding to and spaced apart from the opening 514, and that is in a form of a protrusion extending from the wall surface 213. In particular, the first blocking member 53 is interposed between the second blocking member 54 and the opening 514 when adhering to the wall surface 213 of the front plate 211. When the electronic device 100 (see FIG. 1) is subjected to an impact, the magnetic element 4 may move toward and impact the blocking wall 532, and the second blocking member 54 is provided for abutting against a portion of the base board 531 that is away from the blocking wall 532 of the first blocking member 53 so as to enhance the strength of the first blocking member 53 to block the magnetic element 4. It is noted that the second blocking member 54 matches a shape of the portion of the base board 531 that is away from the blocking wall 532.

Figure 8:
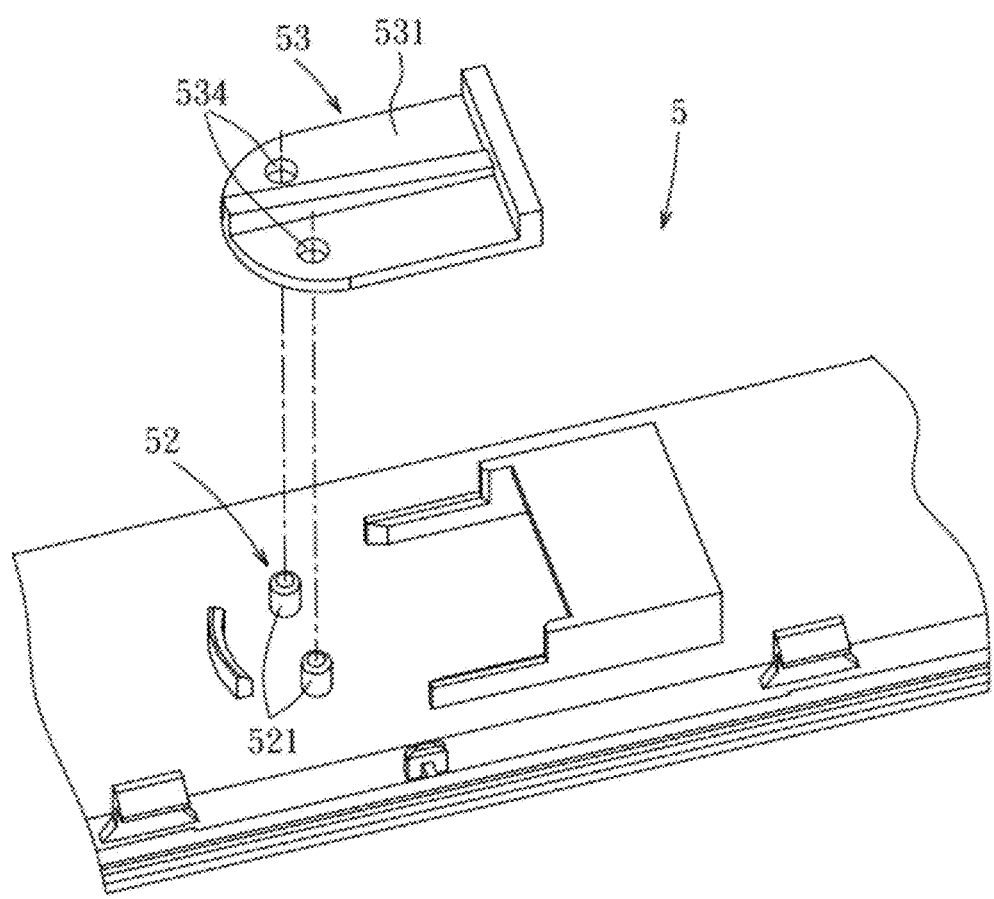
FIG. 8 is a partly exploded perspective view of another example of the retaining mechanism of the embodiment, where the connecting member includes a pair of pillars made of a hot-melt material.
Figure 9:
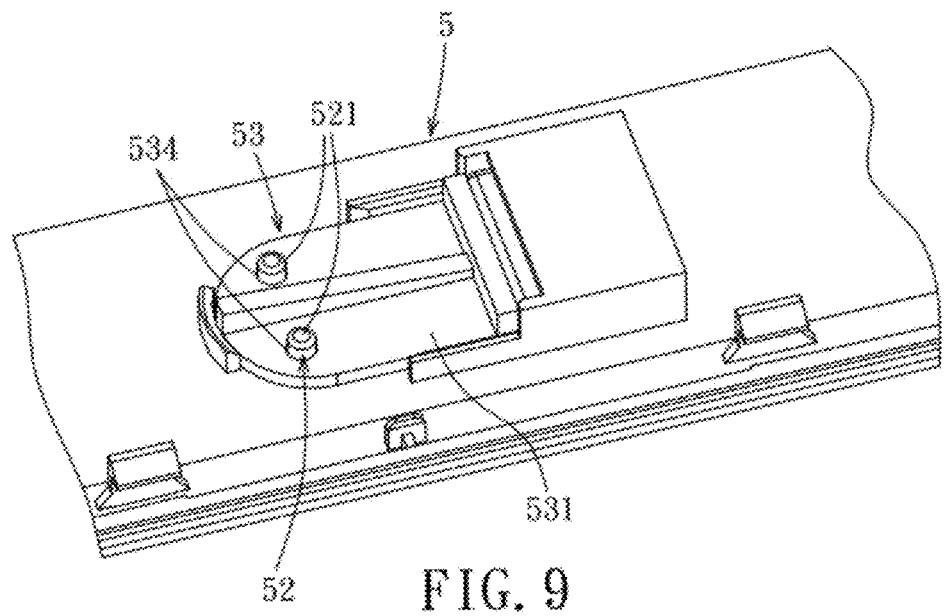
FIG. 9 is a perspective view of the retaining mechanism shown in FIG. 8, where the first blocking member is disposed on the housing to prevent removal of the magnetic element from the retaining casing.
Figure 10:
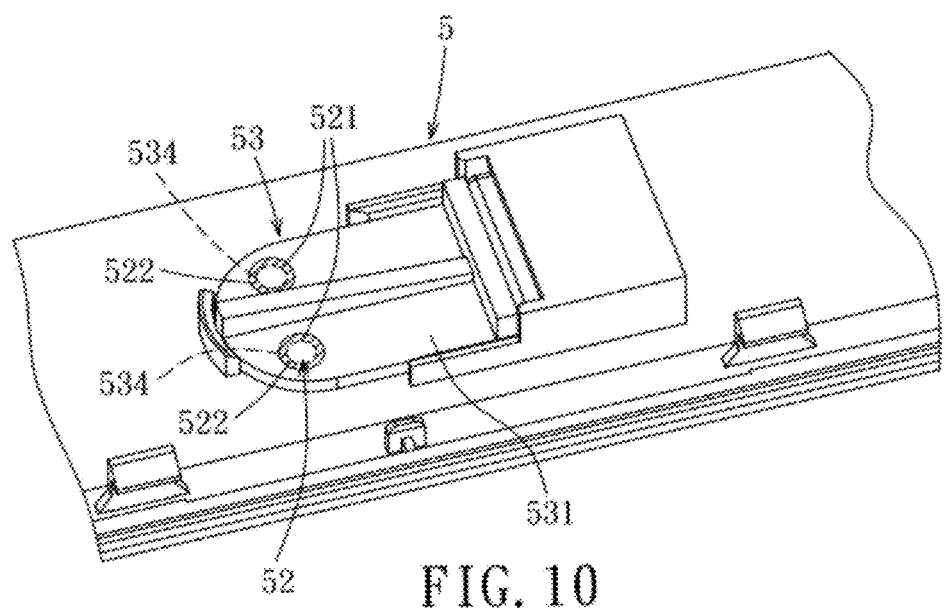
FIG. 10 is a perspective view of the retaining mechanism shown in FIG. 8 for illustrating each of the pillars of the connecting member extending through the base board and having a part exposed from and pressing the base board after a heating process.
Figure 11:
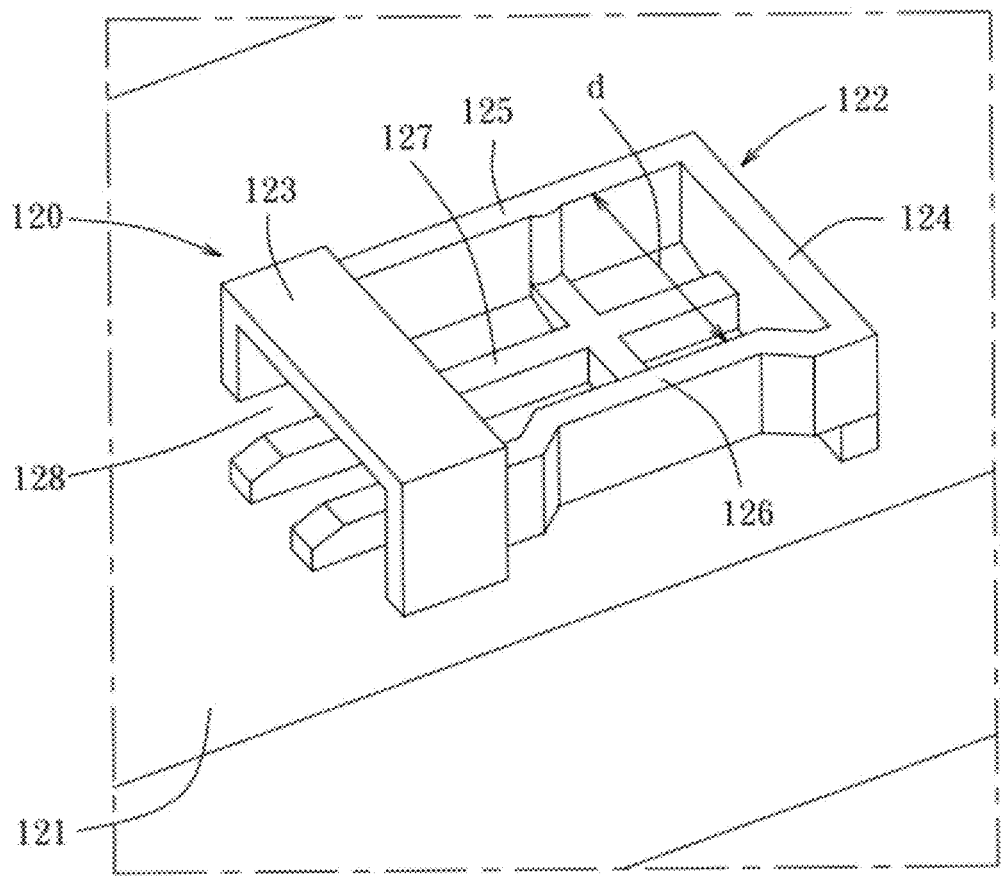
FIG. 11 is a perspective view of a conventional magnetic fixing structure of a notebook computer for retaining a magnetic element.

Referring to FIGS. 8 to 10, another example of the retaining mechanism 5 of the embodiment of the present invention is shown. The first blocking member 53 is formed with two through holes 534. The connecting member 52 includes a pair of pillars 521 that are made of a hot-melt material, that are to be extended through the respective through holes 534 of the base board 531, and that are to be deformed to cover the base board 531 after a heating process to have respective parts 522 exposed from and pressing the base board 531 (see FIG. 10). Consequently, the first blocking member 53 is fixed on the wall surface 213 of the front plate 211 by the connecting member 52. Additionally, the connecting member 52 may include the pillars 521 made of a hot-melt material and the adhesive illustrated in the previous retaining mechanism 5 shown in FIGS. 2 to 7.

To sum up, by virtue of the retaining mechanism 5, the receiving space 513 defined by the retaining casing 51 receives the magnetic element 4 therein, and the first blocking member 53 can prevent removal of the magnetic element 4 from the receiving space 513 through the opening 514 of the retaining casing 51. Therefore, compared to the conventional magnetic fixing structure for a notebook computer, the retaining mechanism 5 of the electronic device 100 according to the present invention is capable of stably retaining the magnetic element 4 in the retaining casing 51 when the electronic device is subjected to an impact.

While the present invention has been described in connection with what is considered the most practical embodiment, it is understood that this invention is not limited to the disclosed embodiment but is intended to cover various arrangements included within the spirit and scope of the broadest interpretations and equivalent arrangements.

What is claimed is:

1. An electronic device comprising:
a first body;
a magnetic inductive switch disposed in said first body;
a second body movably connected to said first body, and including a housing and an electronic element module that is disposed in said housing and that is electrically connected to said magnetic inductive switch;
a magnetic element disposed in said second body for actuating said magnetic inductive switch to send a control signal to said electronic element module when said magnetic element is adjacent to said magnetic inductive switch; and
a retaining mechanism including
a retaining casing disposed on and cooperating with said housing of said second body to define a receiving space therebetween to receive said magnetic element therein, and having an opening that is in spatial communication with said receiving space,
a connecting member disposed on said housing of said second body, and
a first blocking member connected to said housing of said second body by said connecting member, and including a blocking wall disposed adjacent to said opening so as to prevent removal of said magnetic element from said receiving space through said opening.

2. The electronic device as claimed in claim 1, wherein said housing has a wall surface, and said retaining casing includes a U-shaped wall that is disposed perpendicularly on said wall surface and a top wall that is spaced apart from said wall surface and that is connected perpendicularly to and cooperates with said U-shaped wall to define said receiving space and said opening.

3. The electronic device as claimed in claim 2, wherein said U-shaped wall includes two side wall portions, each of which has a first wall segment and a second wall segment connected to said first wall segment, and a connecting wall portion connected between said first wall segments, said first wall segments connected to and cooperating with said top wall of said retaining casing to define said receiving space, said second wall segments cooperatively defining a guiding passage in spatial communication with said opening, said first blocking member having a portion fittingly disposed in said guiding passage.

4. The electronic device as claimed in claim 2, wherein said second body is connected pivotally to said first body, and said housing of said second body includes a front plate and a rear plate joining said front plate, said wall surface being an inner surface of said front plate and facing said rear plate.

5. The electronic device as claimed in claim 1, wherein said retaining mechanism further includes a second blocking member formed on said housing of said second body, and said first blocking member is interposed between said second blocking member and said opening.

6. The electronic device as claimed in claim 1, wherein said first blocking member further includes a base board connected to said blocking wall and fixed on said housing by said connecting member.

7. The electronic device as claimed in claim 6, wherein said base board and said blocking wall of said first blocking member are substantially in an L-shaped connection.

8. The electronic device as claimed in claim 7, wherein said first blocking member further includes a rib disposed longitudinally on said base board and having one end connected to said blocking wall.

9. The electronic device as claimed in claim 6, wherein said base board is formed with a through hole, and said connecting member includes a pillar made of a hot-melt material, extending through said through hole of said base board, and having a part exposed from and pressing said base board.

10. The electronic device as claimed in claim 1, wherein said connecting member is an adhesive.

11. A retaining mechanism for retaining a magnetic element of an electronic device, the electronic device including a first body, a magnetic inductive switch disposed in the first body, and a second body movably connected to the first body and including a housing and an electronic element module that is disposed in the housing and that is electrically connected to the magnetic inductive switch, the magnetic element being disposed in the second body for actuating the magnetic inductive switch to send a control signal to the electronic element module when the magnetic element is adjacent to the magnetic inductive switch, said retaining mechanism comprising:

a retaining casing to be disposed on and to cooperate with the second body for defining a receiving space therebetween for receiving the magnetic element, and having an opening that is to be in spatial communication with said receiving space and that permits insertion of the magnetic element into the receiving space therethrough, a connecting member to be disposed on the second body, and a first blocking member to be connected to the second body by said connecting member, and including a blocking wall to be disposed adjacent to said opening so as to prevent removal of the magnetic element from said receiving space.

12. The retaining mechanism as claimed in claim 11, the housing of the second body including a wall surface, wherein said retaining casing includes a U-shaped wall that is to be disposed perpendicularly on the wall surface and a top wall that is connected to and cooperates with said U-shaped wall and that is to be spaced apart from the wall surface for defining the receiving space and said opening.

13. The retaining mechanism as claimed in claim 12, wherein said U-shaped wall includes two side wall portions, each of which has a first wall segment and a second wall segment connected to said first wall segment, and a connecting wall portion connected between said first wall segments, said first wall segments connected to and cooperating with said top wall of said retaining casing to define the receiving space, said second wall segments cooperatively defining a guiding passage that is in spatial communication with said opening and that is to guide the magnetic element into the receiving space, said first blocking member having a portion fittingly disposed in said guiding passage.

14. The retaining mechanism as claimed in claim 11, wherein said first blocking member further includes a base board connected to said blocking wall and to be fixed on the second body by said connecting member.

15. The retaining mechanism as claimed in claim 14, wherein said base board and said blocking wall of said first blocking member are substantially in an L-shaped connection.

16. The retaining mechanism as claimed in claim 15, wherein said first blocking member further includes a rib disposed longitudinally on said base board and having one end connected to said blocking wall.

17. The retaining mechanism as claimed in claim 14, wherein said base board is formed with a through hole, and said connecting member includes a pillar that is made of a hot-melt material, that is to extend through said through hole of said base board, and that is to be deformed to have a part exposed from and pressing said base board after a heating process.

18. The retaining mechanism as claimed in claim 11, wherein said connecting member is an adhesive.

19. The retaining mechanism as claimed in claim 11, further comprising a second blocking member to be formed on the housing of the second body, said first blocking member being interposed between said second blocking member and said opening.

* * * * *